(12) United States Patent
Murakawa

(10) Patent No.: US 10,108,171 B2
(45) Date of Patent: Oct. 23, 2018

(54) NUMERICAL CONTROLLER CAPABLE OF SPECIFYING HALT POINT

(71) Applicant: FANUC Corporation, Minamitsuru-gun, Yamanashi (JP)

(72) Inventor: Kazuhiko Murakawa, Minamitsuru-gun (JP)

(73) Assignee: FANUC CORPORATION, Minamitsuru-gun, Yamanashi (JP)

( * ) Notice: Subject to any disclaimer, the term of this patent is extended or adjusted under 35 U.S.C. 154(b) by 416 days.

(21) Appl. No.: 14/514,632

(22) Filed: Oct. 15, 2014

(65) Prior Publication Data

US 2015/0112475 A1    Apr. 23, 2015

(30) Foreign Application Priority Data

Oct. 17, 2013  (JP) .................................. 2013-216684

(51) Int. Cl.
   *G05B 19/19*    (2006.01)
(52) U.S. Cl.
   CPC .... *G05B 19/19* (2013.01); *G05B 2219/50047* (2013.01)
(58) Field of Classification Search
   CPC .......... G05B 19/19; G05B 2219/50047; G05B 19/18; B23H 1/02; B23Q 15/00
   USPC ....................................................... 700/189
   See application file for complete search history.

(56) References Cited

U.S. PATENT DOCUMENTS

| | | | | |
|---|---|---|---|---|
| 3,668,653 A | * | 6/1972 | Fair ...................... | G05B 19/371 700/1 |
| 4,709,198 A | * | 11/1987 | Ogo .................... | G05B 19/4065 318/39 |
| 4,815,000 A | * | 3/1989 | Yoneda ................ | G05B 19/408 318/571 |
| 5,010,285 A | | 4/1991 | Kawamura et al. | |
| 5,369,870 A | * | 12/1994 | Ouchi .............. | G05B 19/40937 29/557 |

(Continued)

FOREIGN PATENT DOCUMENTS

| | | |
|---|---|---|
| CN | 1165990 A | 11/1997 |
| CN | 101114167 A | 1/2008 |

(Continued)

OTHER PUBLICATIONS

Decision to Grant a Patent dated Jul. 14, 2015 in Japanese Patent Application No. 2013-216684 (3 pages) with an English Translation (3 pages).

(Continued)

*Primary Examiner* — Robert E Fennema
*Assistant Examiner* — Jigneshkumar C Patel
(74) *Attorney, Agent, or Firm* — Drinker Biddle & Reath LLP

(57) ABSTRACT

A numerical controller of the invention includes a halt block specifying unit that specifies, from among blocks corresponding to unmachined sections of a machining program, a command block in which halting is allowed to occur as a halt block during an automatic operation of a machine tool, a halt position selecting unit that selects, as a position at which the automatic operation is halted, any one of a start point, an intermediate point, and an end point of the halt block, and a halting unit that halts the automatic operation at a position selected by the halt position selecting unit.

1 Claim, 8 Drawing Sheets

(56) References Cited

U.S. PATENT DOCUMENTS

| | | | | |
|---|---|---|---|---|
| 6,073,058 | A * | 6/2000 | Cossen | G05B 19/4093 700/182 |
| 6,862,492 | B2 * | 3/2005 | Sagasaki | G05B 19/4067 318/565 |
| 2008/0024083 | A1 | 1/2008 | Yamaguchi et al. | |
| 2008/0249653 | A1 * | 10/2008 | Ichikawa | G05B 19/4155 700/189 |
| 2014/0074279 | A1 * | 3/2014 | West | G05B 19/409 700/159 |

FOREIGN PATENT DOCUMENTS

| | | |
|---|---|---|
| JP | 49-044185 A | 4/1974 |
| JP | 55-069807 A | 5/1980 |
| JP | 59-095609 A | 6/1984 |
| JP | H01-229305 A | 9/1989 |
| JP | 2003-001547 A | 1/2003 |
| JP | 2009-181174 A | 8/2009 |
| JP | 2014-049029 A | 3/2014 |

OTHER PUBLICATIONS

Notification of Reasons for Refusal dated Mar. 10, 2015, along with its English-language translation, in corresponding Japanese Patent Application 2013-216684.

The Notification of the First Office Action dated Nov. 21, 2016 in Chinese Patent Application No. 2014105532851 (5 pages) with an English Translation (8 pages).

\* cited by examiner

NUMERICAL CONTROLLER CAPABLE OF SPECIFYING HALT POINT

RELATED APPLICATION DATA

This application claims priority under 35 U.S.C. § 119 and/or § 365 to Japanese Application No. 2013-216684 filed Oct. 17, 2013, the entire contents is incorporated herein by reference.

BACKGROUND OF THE INVENTION

1. Field of the Invention

The present invention relates to a numerical controller that controls a machine tool and, more particularly, to a numerical controller capable of specifying a halt point.

2. Description of the Related Art

There is a case where a halt of work machining by a machine tool which has not been planned before start of the machining becomes necessary during the machining. Examples of such a case include: a case where it is necessary to observe a machining state; a case where interruption by a different work (machining) occurs; a case where it is necessary to perform replacement of a maintenance part during the machining (replacement of a wire in the case of, e.g., wire discharge machining); a case where it is necessary to respond to a warning during machining (collection of a used wire, in the case of, e.g., wire discharge machining); a case where it is necessary to wait for reduction of a raised temperature of machining liquid or machine tool; a case where it is necessary to remove machining chips or contamination of machining liquid; a case where it is necessary to match the machining operation time with working time of an operator; and the like.

For example, an automatic operation is halted using a feed-hold stop or a single block stop function (see JP 1-229305 A), and machining is halted using a halt command for halting a machining program (see JP 2003-001547 A) or using a sequence number collation stop function. A machining flaw or tool damage may occur due to halt and subsequent resume operations. Therefore, an operator needs to perform the feed-hold stop or single block stop function after waiting, while observing the machining state, until a favorable condition is reached.

As a method of halting an automatic operation of the machine tool, there is known one that previously inserts a halt command into a machining program. However, in this method, more halt commands than are necessary need to be inserted for allowing execution of an unplanned halt operation. Further, the automatic operation cannot be halted in a block into which the halt command is not inserted.

In order to halt the automatic operation using the feed-hold stop or single block stop function, it is necessary to execute a halt operation at a convenient timing so that the machining flaw or tool damage does not occur due to halt and subsequent resume operations. Particularly, in a machining program composed of minute blocks, it is necessary to execute the halt operation within a short period of time in a timely fashion. Further, in a machining process to be performed at a low speed, like an electrical discharge machining process, sometimes an operator is forced to wait for a long time until a point at which the machining process can be halted is reached.

In order to halt the automatic operation using the halt command (M00/M01, etc.), it is necessary to previously insert the halt command into the machining program at a plurality of points before start of the machining, on the assumption that the operation is halted. This takes a lot of time and effort in creation of the machining program. Further, the automatic operation cannot be halted in a command block into which the halt command is not inserted.

In order to halt the automatic operation using the sequence number collation stop function, it is necessary to previously set, before start of the machining, a command block in which the halt is allowed to occur. Therefore, it is impossible to cope with a case where there occurs an additional need to halt the operation after start of the machining.

When minute paths successively appear in the machining program at time of checking the machining program, it is necessary to perform a start-up operation repeatedly in the single block stop function, making the operation complicated.

SUMMARY OF THE INVENTION

An object of the present invention is to provide a numerical controller that controls a machine tool and is capable of specifying a halt point. More particularly, an object of the present invention is to provide a numerical controller that, when there occurs a need to halt the automatic operation, does not execute the halt operation immediately, but executes with ease the halt operation in a command block or in a machining state in which it seems safe to execute it.

A numerical controller according a first aspect of the present invention performs machining while controlling a machine tool according to a machining program, the numerical controller including: a halt block specifying unit configured to specify, from among blocks corresponding to unmachined sections of the machining program, a command block in which a halt is allowed to occur as a halt block during an automatic operation of the machine tool; a halt position selecting unit configured to select, as a position at which the automatic operation is halted, any one of a start point, an intermediate point, and an end point of a block specified by the halt block specifying unit; and a halting unit configured to halt the automatic operation at a position selected by the halt position selecting unit in the block specified by the halt block specifying unit.

A numerical controller according a second aspect of the present invention performs machining while controlling a machine tool according to a machining program, the numerical controller including: a halt command specifying unit configured to register a command at which an automatic operation of the machine tool is safely halted; a halt command enable/disable switching unit configured to switch enable/disable of the halt based on the command registered by the halt command specifying unit; a halt position selecting unit configured to select, as a position at which the automatic operation is halted, any one of a start point, an intermediate point, and an end point of a block including the command registered by the halt command specifying unit; and a halting unit configured to halt the automatic operation at a position selected by the halt position selecting unit in the block in which the command registered by the halt command specifying unit is executed when the halt based on the command registered by the halt command specifying unit is enabled by the halt command enable/disable switching unit.

A numerical controller according a third aspect of the present invention performs machining while controlling a machine tool according to a machining program, the numerical controller including: a non-cutting state determination unit configured to determine a non-cutting state during an automatic operation of the machine tool; a non-cutting state halt enable/disable switching unit configured to switch enable/disable of the halt operation executed in the non-cutting state; and a halting unit configured to halt the automatic operation when the halt operation executed in the non-cutting state is enabled by the non-cutting state halt enable/disable switching unit and when the non-cutting state is determined by the non-cutting state determination unit.

A numerical controller according to a fourth aspect of the present invention performs machining while controlling a machine tool according to a machining program, the numerical controller including: a consecutive execution block number registering unit configured to register the number of blocks to be executed in a single activation of the automatically operated machine tool; a specified block number halt enable/disable switching unit configured to switch enable/disable of a halt to be executed when the number of blocks actually executed in the single activation reaches the number of blocks registered by the consecutive execution block number registering unit; and a halting unit configured to halt the automatic operation when a specified block number halt is enabled by the specified block number halt enable/disable switching unit and when the number of blocks actually executed reaches the number of blocks registered by the consecutive execution block number registering unit.

BRIEF DESCRIPTION OF THE DRAWINGS

Other objects and features of the present invention will become apparent from the following detailed description taken in conjunction with the accompanying drawings, in which.

DETAILED DESCRIPTION OF THE PREFERRED EMBODIMENTS

Figure 1:
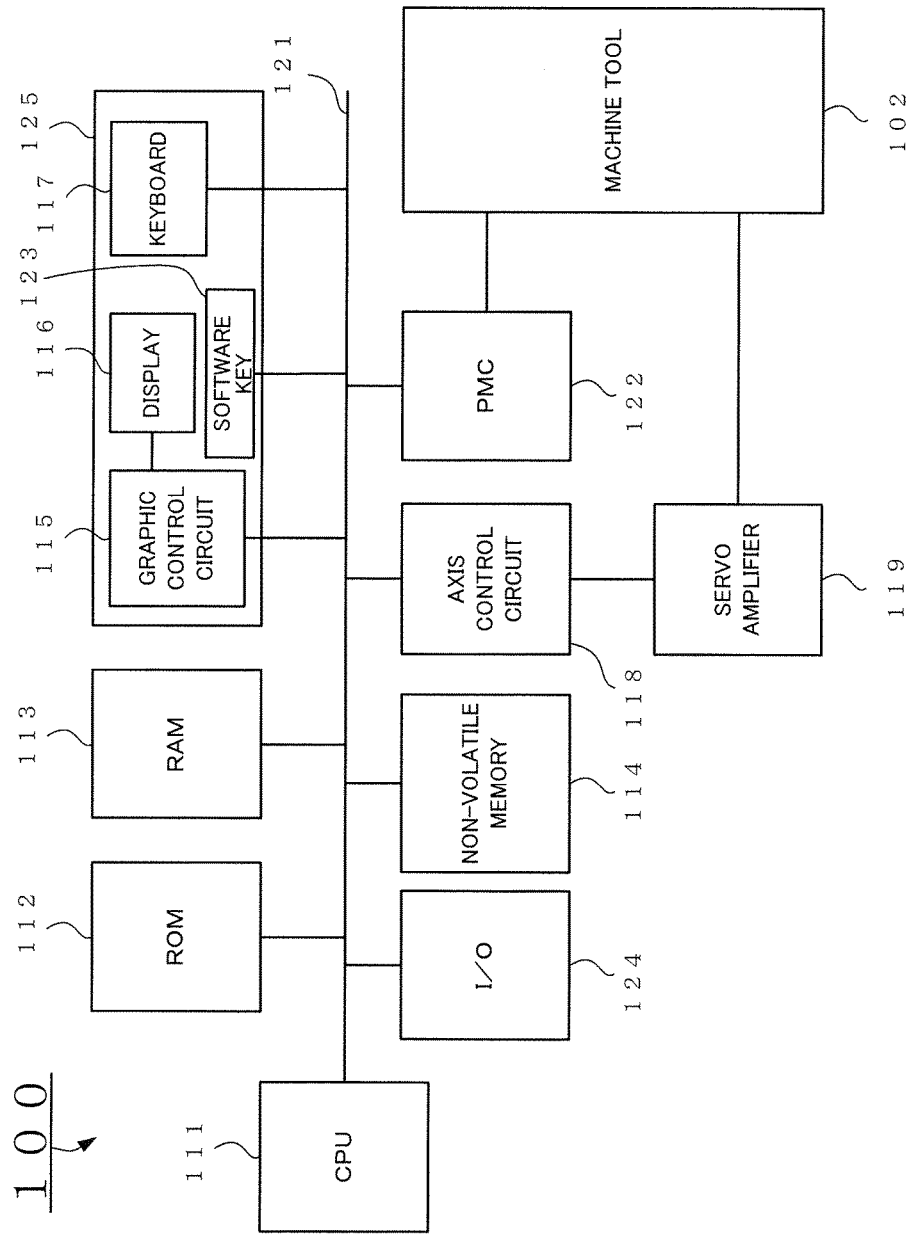
FIG. 1 is a view explaining a numerical controller controlling a machine tool.

FIG. 1 is a view explaining a controller controlling a machine tool.

A numerical controller 100 controls a machine tool 102. A CPU 111 serving as a processor controls the entire operation of the numerical controller 100 according to a system program stored in a ROM 112. A RAM 113 stores various data and an input/output signal. Various data stored in a non-volatile memory 114 are retained even after power-off.

A graphic control circuit 115 converts a digital signal to a display signal and supplies the obtained display signal to a display 116. A keyboard 117 is a device for inputting various setting data, provided with numerical keys, character keys, and the like.

An axis control circuit 118 receives from the CPU 111 a moving command of each axis and outputs the moving command to a servo amplifier 119. The servo amplifier 119 receives the moving command and drives a servo motor (not illustrated) of the machine tool 102. The components described above are connected to each other via a bus 121. A PMC (Programmable Machine Controller) 122 receives a T function signal (tool selecting command) and the like via the bus 121 during execution of a machining program. Then, the PMC 122 processes the received signal according to a sequence program and outputs as an operation command to control the machine tool 102.

Further, the PMC 122 receives a state signal from the machine tool 102 and transfers a necessary input signal to the CPU 111. In addition, a software key 123 whose function changes according to the system program or the like and an interface 124 for transmitting NC data to an external device such as a storage device are connected to the bus 121. The software key 123 is arranged on a display/MDI panel 125 together with the display 116 and the keyboard 117.

The above is a known numerical controller configured to control a machine tool. In the following some embodiments of the present invention, the numerical controller 100 is configured to be capable of: specifying a halt block from among blocks corresponding to unmachined sections during machining, and halting the automatic operation when the halt block is executed; previously registering a command allowing a halt operation to be executed and halting the automatic operation according to the registered command; analyzing a non-cutting state where a machining flaw or tool damage does not occur due to halt and subsequent resume operations and halting the automatic operation based on the analysis; and setting the number of blocks to be executed in a single activation of the machine tool and halting the automatic operation when the number of blocks actually executed reaches the set number of blocks. With each of the above configurations, the halt/resume of the automatic operation can be executed without involving the machining flaw or tool damage.

This eliminates the need of inserting the halt command, thereby saving time and trouble in creating the machining program, and eliminates the need of measuring a timing at which the halt operation is executed. Further, it is not necessary to observe the machining state at the machine side until a state where the halt operation can be executed is reached. Further, when a machining program composed of successive minute blocks is checked, the minute blocks are executed in a block unit corresponding to the specified number of blocks, facilitating a check operation.

<First Embodiment>

Figure 2:
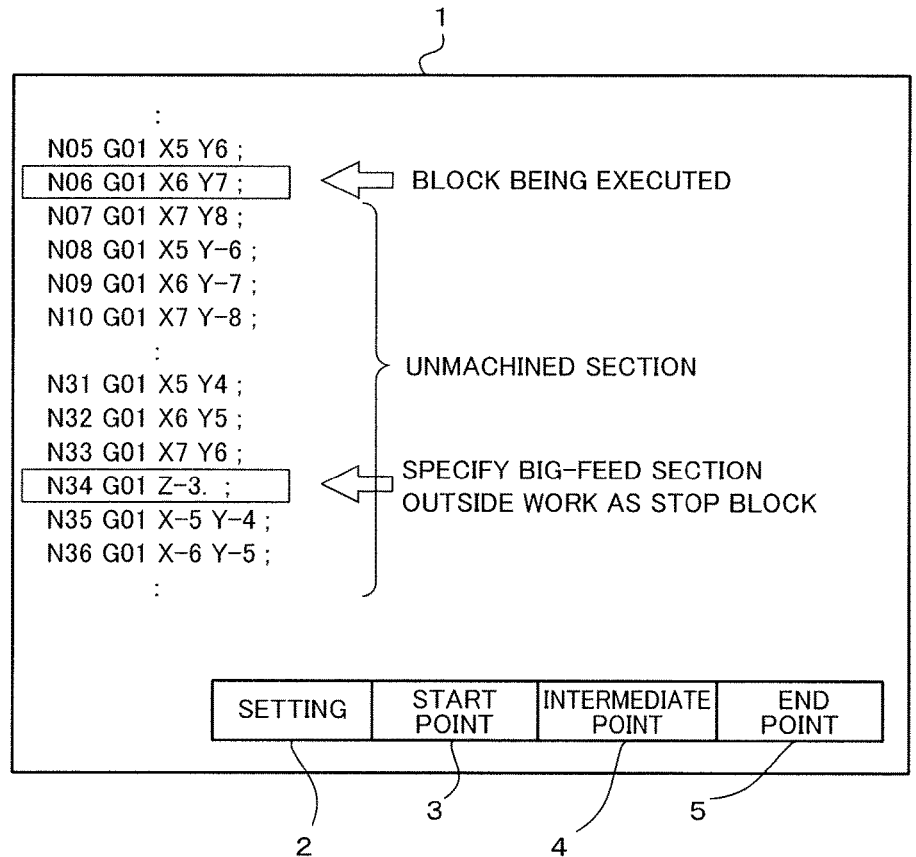
FIG. 2 is a view explaining a state where an operator moves a program cursor to select a command block in which a halt is allowed to occur in a first embodiment.
Figure 3:
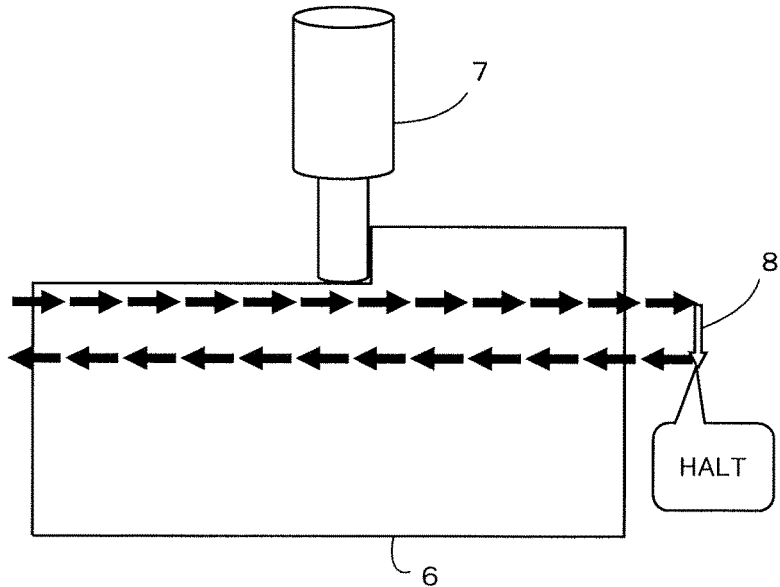
FIG. 3 is a view explaining a state where an automatic operation of a machine tool is halted in a case where a tool is set as a halt block in the first embodiment.
Figure 4:
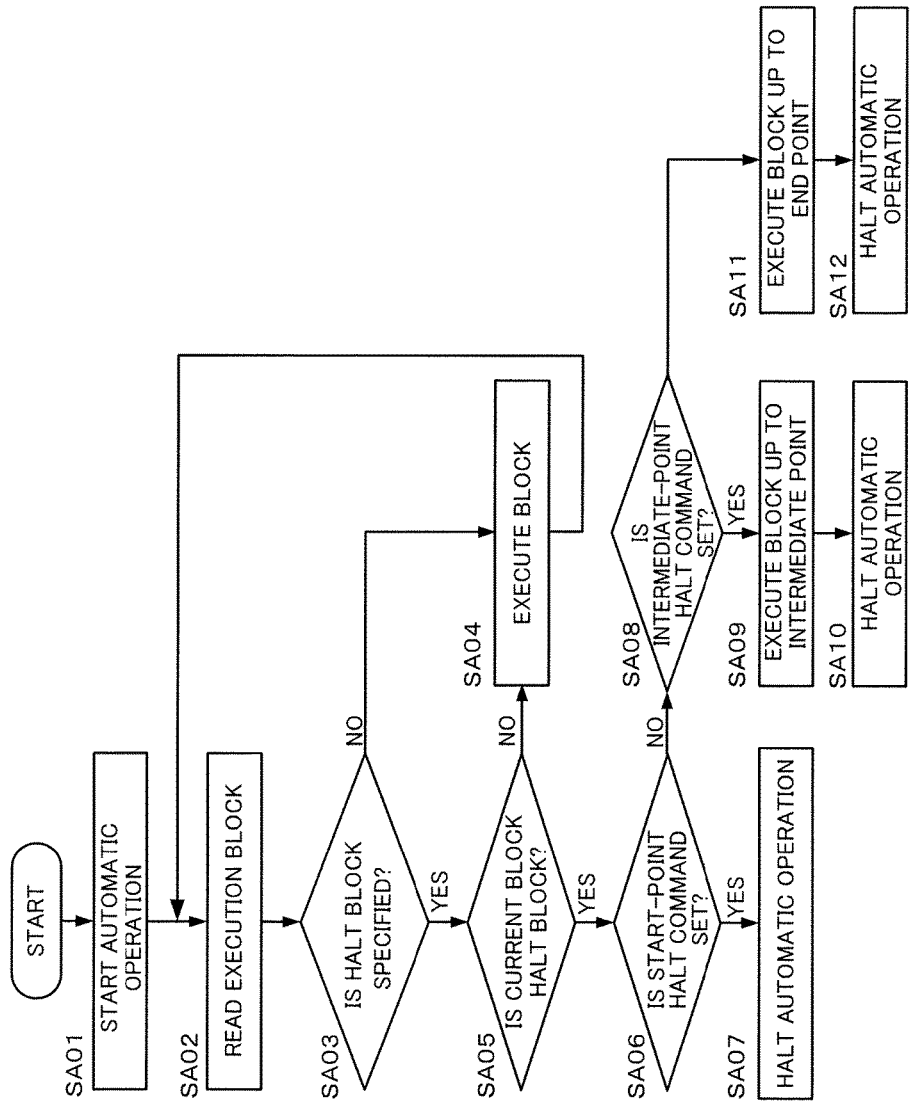
FIG. 4 is a view explaining a processing flow in the first embodiment.

FIG. 2 is a view explaining a state where an operator moves a program cursor to select a command block in which a halt is allowed to occur in a first embodiment. It is assumed that a display screen 1 illustrated in FIG. 2 is displayed on the display 116 of the numerical controller 100. FIG. 3 is a view explaining a state where an automatic operation of a machine tool is halted in a case where a tool 7 is set as a halt block in the first embodiment. FIG. 4 is a view explaining a processing flow in the first embodiment.

In the machining program being executed, a halt block (command block in which the halt is allowed to occur) can be specified from among blocks corresponding to unmachined sections. The halt block can be specified by moving the program cursor to a target command block, by specifying a sequence number in the machining program, or by specifying a path of the unmachined section of a drawing path using a touch panel.

As an example in which the halt block is specified using the program cursor, the operator moves the program cursor to specify a command block in which the halt is allowed to occur. The automatic operation is halted at a start point of the halt block, an intermediate point thereof, or an end point thereof. The automatic operation is halted when a command block being read for execution is the halt block. It is possible to make a setting such that the automatic operation is halted at any one of the start point of the halt block, intermediate point thereof, or end point thereof. Thus, when there occurs a need to halt the automatic operation after start of the machining, the automatic operation can easily be halted in a command block in which the halt operation does not affect the machining.

In FIG. 2, the program cursor is moved to a block having a sequence number of N34, and then a setting button 2 is pressed, whereby the halt block can be specified. By selecting any one of a start point button 3, an intermediate point button 4, and an endpoint button 5, it is possible to specify at which position of the halt block the automatic operation is to be halted. In a case where a display part of the display 116 is configured as a touch panel system, the above buttons can be touch type buttons.

As illustrated in FIG. 3, the machine tool 102 controlled by the numerical controller 100 machines a work 6 by the automatic operation. The machine tool 102 halts the automatic operation in a halt block 8.

A processing flow illustrated in FIG. 4 will be described according to respective process steps.

[Step SA01] The automatic operation of the machine tool is started.

[Step SA02] An execution block is read.

[Step SA03] It is determined whether or not the halt block is specified. When the halt block is specified (YES), the processing flow proceeds to step SA05. When the halt block is not specified (NO), the processing flow proceeds to step SA04.

[Step SA04] The read block is executed, and the processing flow is returned to step SA02.

[Step SA05] It is determined whether or not a current block is the halt block. When the current block is the halt block (YES), the processing flow proceeds to step SA06. When the current block is not the halt block (NO), the processing flow returns to step SA04.

[Step SA06] It is determined whether or not a command instructing a start-point halt is set. When the start-point halt command is set (YES), the processing flow proceeds to step SA07. When the start-point halt command is not set (NO), the processing flow proceeds to step SA08.

[Step SA07] The automatic operation of the machine tool is halted.

[Step SA08] It is determined whether or not a command instructing an intermediate-point halt is set. When the intermediate-point halt command is set (YES), the processing flow proceeds to step SA09. When the intermediate-point halt command is not set (NO), the processing flow proceeds to step SA11. Here, a case where the intermediate-point halt command is not set indicates that a command instructing an end-point halt is set.

[Step SA09] The block is executed up to the intermediate point.

[Step SA10] The automatic operation of the machine tool is halted.

[Step SA11] The block is executed up to the end point.

[Step SA12] The automatic operation of the machine tool is halted.

<Second Embodiment>

Figure 5:
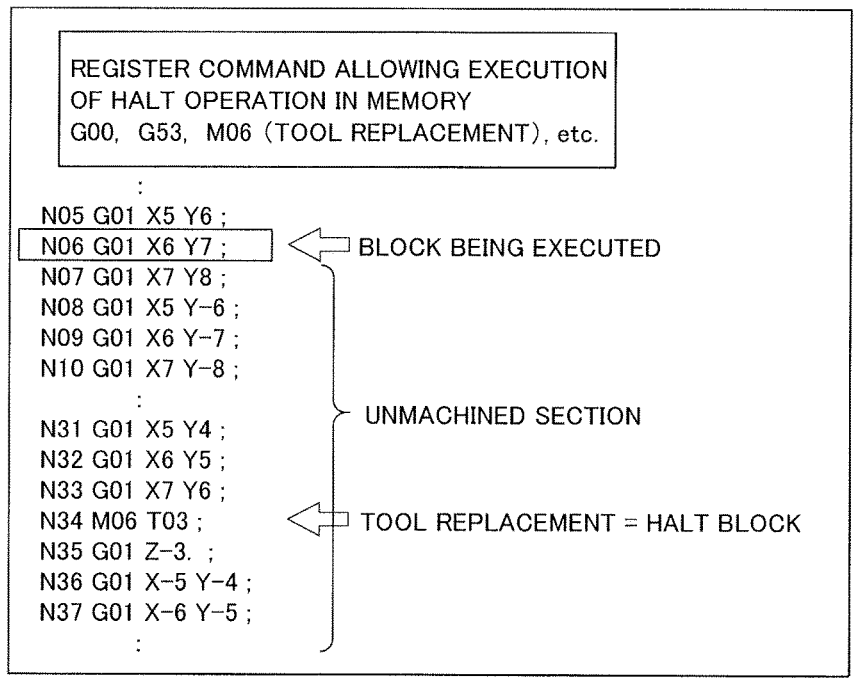
FIG. 5 is a view explaining a second embodiment.
Figure 6:
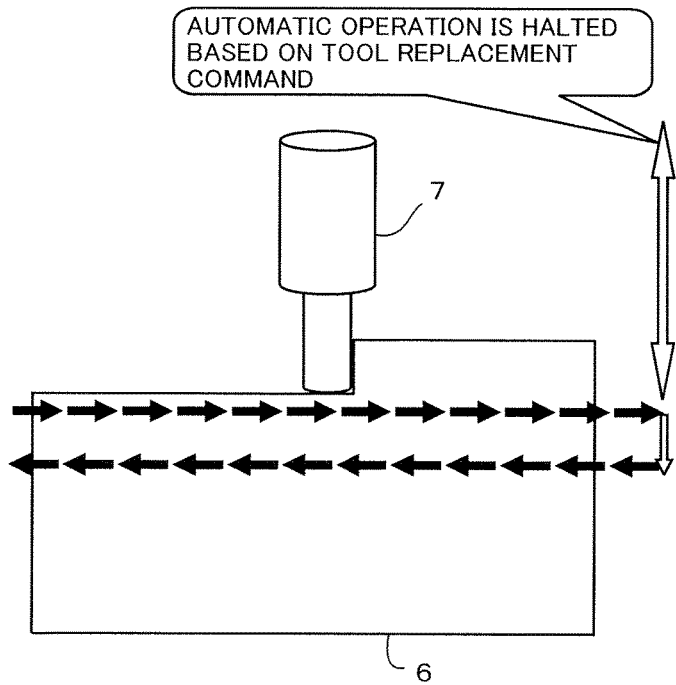
FIG. 6 is a view explaining a state where the automatic operation of the machine tool is halted by a command in which the tool is previously registered in the second embodiment.
Figure 7:
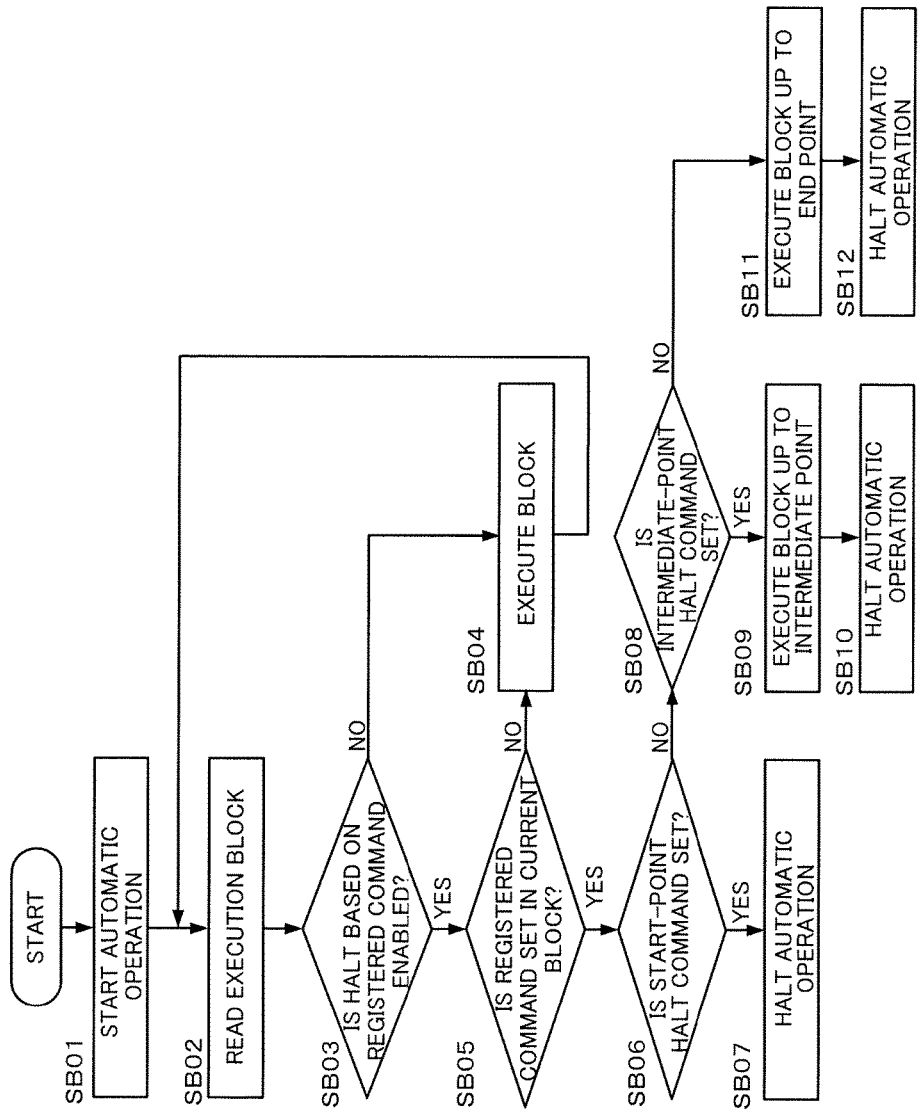
FIG. 7 is a view explaining a processing flow in the second embodiment.

FIG. 5 is a view explaining a second embodiment. FIG. 6 is a view explaining a state where the automatic operation of the machine tool is halted by a command in which the tool 7 is previously registered in the second embodiment. FIG. 7 is a view explaining a processing flow in the second embodiment.

A plurality of commands allowing execution of the halt operation can be set in a memory. As the memory, the non-volatile memory 114 (see FIG. 1) can be used. The commands each allowing execution of the halt operation not only can be registered in the memory, but also can be defined previously in the system.

A switch capable of switching enable/disable of the halt based on the registered command is prepared. This switch can be prepared as a software key displayed on the display 116. Here, assume that the halt based on the registered command is enabled by the switch while the machine tool 102 machines the work 6 according to the machining program. In this case, when a command block read for execution includes any one of the plurality of registered commands, the automatic operation is halted in the read command block. It is possible to make a setting such that the automatic operation is halted at any one of the start point of the halt block, intermediate point thereof, or end point thereof (see FIG. 2). Thus, when there occurs a need to halt the automatic operation after start of the machining, the automatic operation can easily be halted in a command block in which the halt operation does not affect the machining.

According to the second embodiment, the operator can previously register, in the memory, a command allowing the halt operation to be executed without any problems. The operator can enable the halt based on the registered command when there occurs a need to halt the automatic operation during the machining. When any one of the plurality of registered commands is set in a block to be currently executed, the machine tool 102 can halt the automatic operation at any one of the start point, intermediate point, and end point of the block to be currently executed.

A processing flow illustrated in FIG. 7 will be described according to respective process steps.

[Step SB01] The automatic operation of the machine tool is started.

[Step SB02] An execution block is read.

[Step SB03] It is determined whether or not the halt based on the registered command is enabled. When the halt is enabled (YES), the processing flow proceeds to step SB05. When the halt is disabled (NO), the processing flow proceeds to step SB04.

[Step SB04] The read block is executed, and the processing flow is returned to step SB02.

[Step SB05] It is determined whether or not the registered command is set in a current block. When the registered command is set in the current block (YES), the processing flow proceeds to step SB06. When the registered command is not set in the current block (NO), the processing flow returns to step SB04.

[Step SB06] It is determined whether or not a command instructing a start-point halt is set. When the start-point halt command is set (YES), the processing flow proceeds to step SB07. When the start-point halt command is not set (NO), the processing flow proceeds to step SB08.

[Step SB07] The automatic operation of the machine tool is halted.

[Step SB08] It is determined whether or not a command instructing an intermediate-point halt is set. When the intermediate-point halt command is set (YES), the processing flow proceeds to step SB09. When the intermediate-point halt command is not set (NO), the processing flow proceeds to step SB11.

[Step SB09] The block is executed up to the intermediate point.

[Step SB10] The automatic operation of the machine tool is halted.

[Step SB11] The block is executed up to the end point.

[Step SB12] The automatic operation of the machine tool is halted.

<Third Embodiment>

Figure 8:
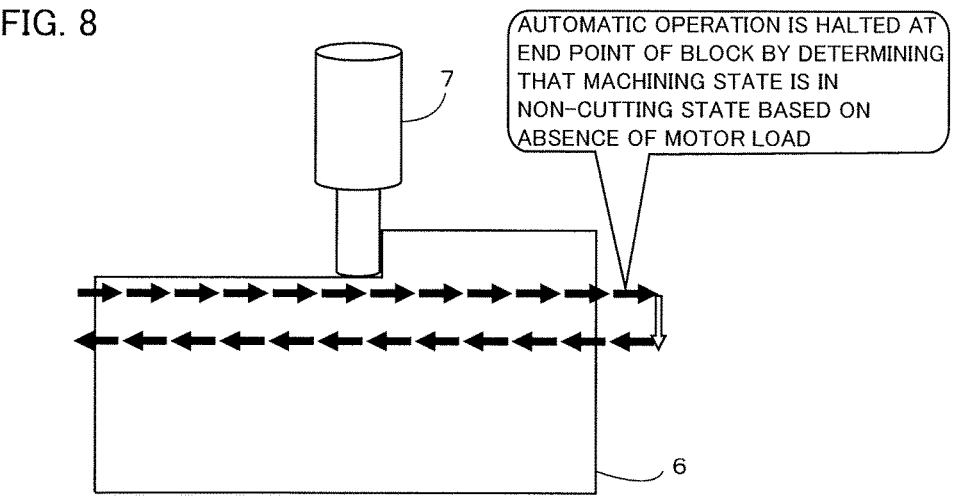
FIG. 8 is a view explaining a state where the automatic operation of the machine tool is halted in a third embodiment.
Figure 9:
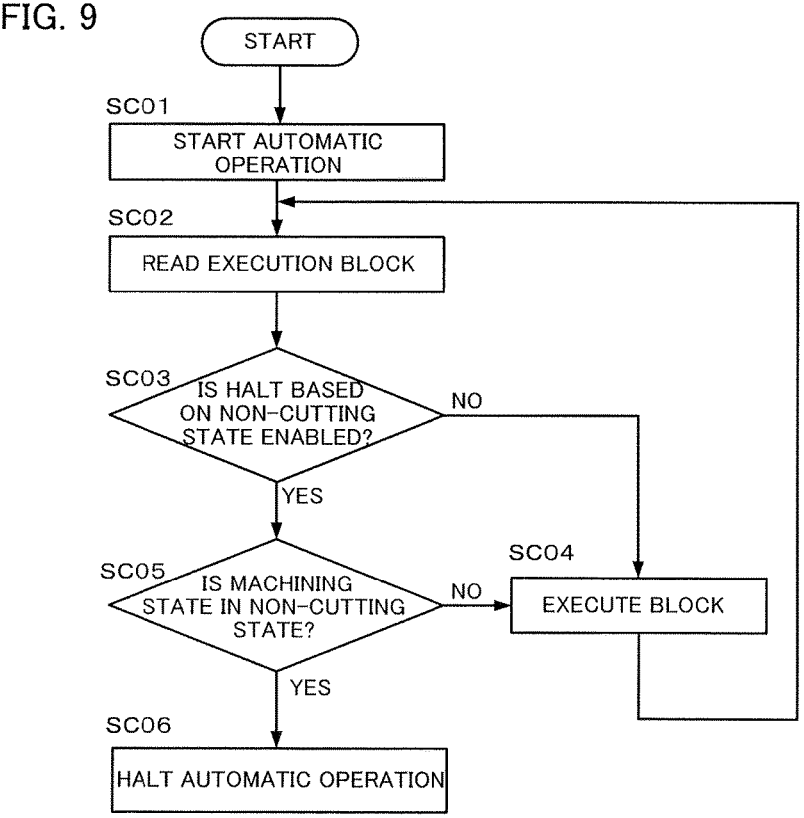
FIG. 9 is a view explaining a processing flow in the third embodiment.

FIG. 8 is a view explaining a state where the automatic operation of the machine tool is halted in a third embodiment. FIG. 9 is a view explaining a processing flow in the third embodiment.

When there occurs a need to halt the automatic operation after start of the machining, the operator selects halt based on a non-cutting state using an operation button. It is determined whether or not the machining state is in the non-cutting state (state where cutting is not performed) based on a motor load state or a discharge state (in the case of discharge machining), and when an affirmative result is obtained, the automatic operation is halted.

A switch capable of switching enable/disable of the halt based on the non-cutting state is prepared. When the halt based on the non-cutting state is enabled by the switch during the machining, it is determined whether or not the machining state is in the non-cutting state based on a motor load state or a discharge state (in the case of discharge machining), and when an affirmative result is obtained, the automatic operation is halted. Thus, when there occurs a need to halt the automatic operation after start of the machining, the automatic operation can easily be halted in the non-cutting state in which the halt operation does not affect the machining.

A processing flow illustrated in FIG. 9 will be described according to respective process steps.

[Step SC01] The automatic operation of the machine tool is started.

[Step SC02] An execution block is read.

[Step SC03] It is determined whether or not the halt based on the non-cutting state is enabled. When the halt is enabled (YES), the processing flow proceeds to step SC05. When the halt is disabled (NO), the processing flow proceeds to step SC04.

[Step SC04] The read block is executed, and the processing flow is returned to step SC02.

[Step SC05] It is determined whether or not the machining state is in the non-cutting state. When the machining state is in the non-cutting state (YES), the processing flow proceeds to step SC06. When the machining state is not in the non-cutting state (NO), the processing flow returns to step SC04.

[Step SC06] The automatic operation of the machine tool is halted.

<Fourth Embodiment>

Figure 10:
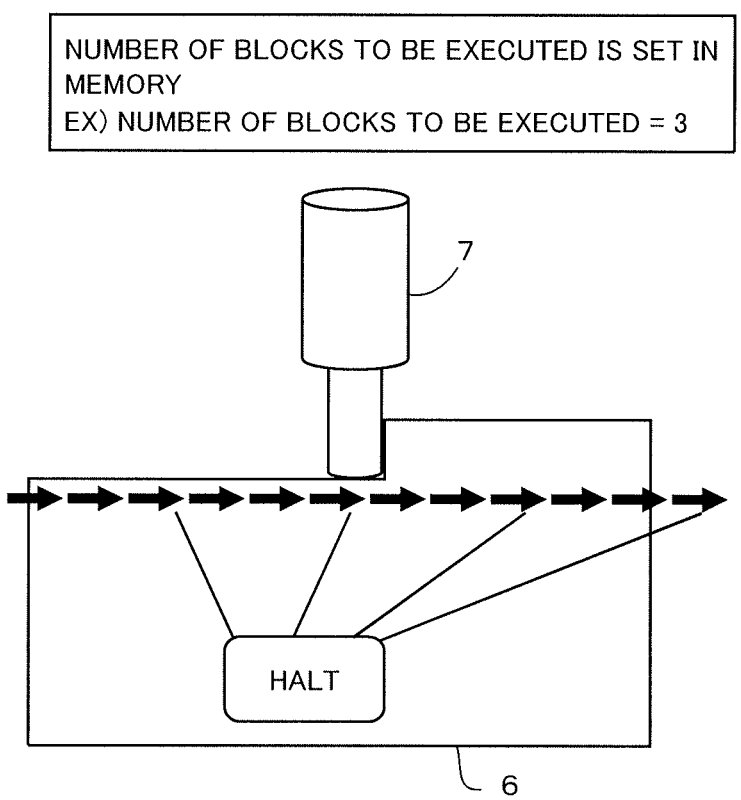
FIG. 10 is a view explaining a state where the automatic operation of the machine tool is halted in a fourth embodiment.
Figure 11:
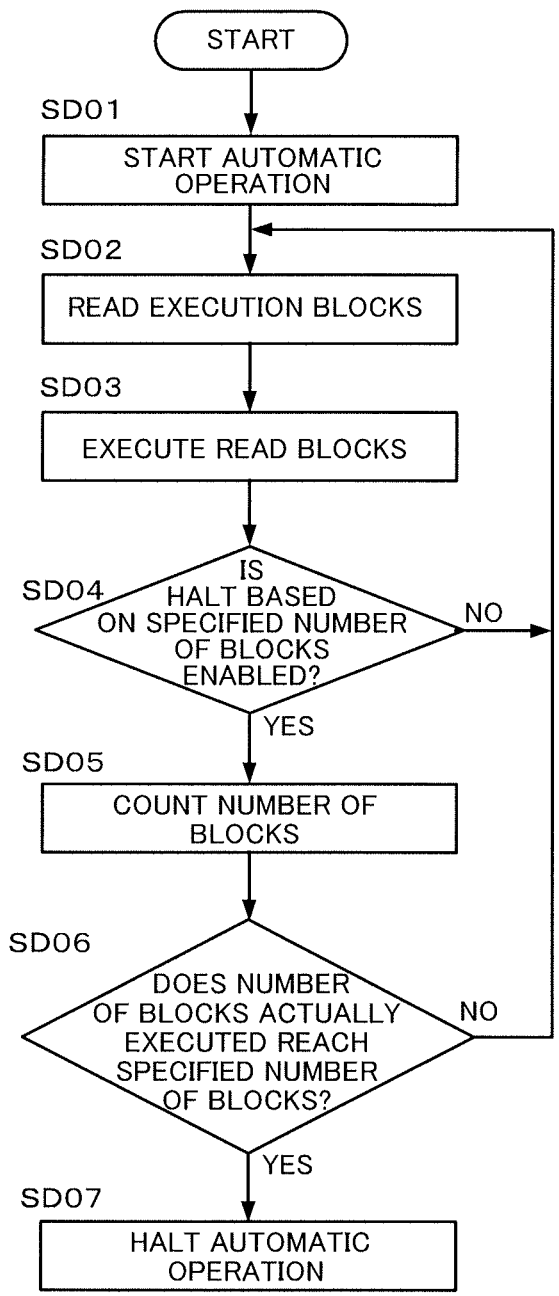
FIG. 11 is a view explaining a processing flow in the fourth embodiment.

FIG. 10 is a view explaining a state where the automatic operation of the machine tool is halted in a fourth embodiment. FIG. 11 is a view explaining a processing flow in the fourth embodiment. The number of blocks to be executed by a single activation of the machine tool 102 can be registered in the memory. A switch capable of switching enable/disable of halt based on the specified number of blocks is prepared. When the halt based on the specified number of blocks is enabled by the switch during the machining, the automatic operation is halted when the number of blocks actually executed (including the block currently being executed) reaches the number of blocks registered in the memory. Thus, when there occurs a need to halt the automatic operation after start of the machining, the automatic operation can easily be halted in a command block coming after the current and several subsequent blocks in which the halt operation does not affect the machining. In FIG. 10, "3" is stored in the memory as the number of blocks to be executed.

A processing flow illustrated in FIG. 11 will be described according to respective process steps.

[Step SD01] The automatic operation of the machine tool is started.

[Step SD02] An execution block is read.

[Step SD03] The read block is executed.

[Step SD04] It is determined whether or not the halt based on the specified number of blocks is enabled. When the halt is enabled (YES), the processing flow proceeds to step SD05. When the halt is disabled (NO), the processing flow proceeds to step SD02.

[Step SD05] The number of blocks is counted.

[Step SD06] It is determined whether or not the number of blocks executed reaches the specified number of blocks. When the number of blocks actually executed reaches the specified number of blocks (YES), the processing flow proceeds to SD07. When the number of blocks actually executed does not reach the specified number of blocks (NO), the processing flow returns to SD02.

[Step SD07] The automatic operation of the machine tool is halted.

The invention claimed is:

1. A numerical controller including a processor configured to perform machining while controlling a machine tool according to a machining program, the processor of the numerical controller configured to:

register a plurality of commands which an automatic operation of the machine tool is safely halted;

switch enabling/disabling of the halt based on the plurality of registered commands;

select, as a position at which the automatic operation is halted, any one of a start point of a block by selecting a setting point button and a start point button, an intermediate point of the block by selecting the setting point button and an intermediate point button, and an end point of the block by selecting the setting point button and an end point button based on a command of the plurality of registered commands and based on the selection of the setting button and the selection of the any one of the start point button, the intermediate point button, and the end point button by an operator; and halt the automatic operation at the selected position when the command of the plurality of registered commands is executed and when switching enabling/disabling of the halt based on the plurality of registered commands.

* * * * *